United States Patent
Löw

(10) Patent No.: US 11,939,530 B2
(45) Date of Patent: Mar. 26, 2024

(54) DEPOLYMERISATION METHOD

(71) Applicant: TUBIS Engineering GmbH, Munich (DE)

(72) Inventor: Peter Löw, Munich (DE)

(73) Assignee: TUBIS Engineering GmbH, Munich (DE)

( * ) Notice: Subject to any disclaimer, the term of this patent is extended or adjusted under 35 U.S.C. 154(b) by 0 days.

(21) Appl. No.: 17/605,965

(22) PCT Filed: Apr. 24, 2020

(86) PCT No.: PCT/EP2020/061448
§ 371 (c)(1),
(2) Date: Oct. 22, 2021

(87) PCT Pub. No.: WO2020/216893
PCT Pub. Date: Oct. 29, 2020

(65) Prior Publication Data
US 2022/0195311 A1    Jun. 23, 2022

(30) Foreign Application Priority Data
Apr. 25, 2019   (EP) .................................... 19171126

(51) Int. Cl.
| C10G 1/10 | (2006.01) |
| B01D 3/14 | (2006.01) |
| B01D 3/32 | (2006.01) |
| B01D 17/02 | (2006.01) |
| C10G 1/00 | (2006.01) |
| C10G 1/08 | (2006.01) |

(52) U.S. Cl.
CPC ............... *C10G 1/10* (2013.01); *B01D 3/143* (2013.01); *B01D 3/32* (2013.01); *B01D 17/02* (2013.01); *C10G 1/002* (2013.01); *C10G 1/08* (2013.01); *C10G 2300/1003* (2013.01)

(58) Field of Classification Search
None
See application file for complete search history.

(56) References Cited

U.S. PATENT DOCUMENTS

| 6,011,187 | A | 1/2000 | Horizoe et al. |
| 7,905,990 | B2 | 3/2011 | Freel |
| 10,787,609 | B2 * | 9/2020 | Garcia-Perez ........... C10G 1/02 |
| 2007/0062104 | A1 * | 3/2007 | Smith ..................... C10G 1/02 44/629 |

(Continued)

FOREIGN PATENT DOCUMENTS

| CN | 109562301 A | 4/2019 |
| EP | 3 260 181 A1 | 12/2017 |

OTHER PUBLICATIONS

Office Action dated Aug. 31, 2022 in corresponding European Patent Application No. 20720067.6.

(Continued)

*Primary Examiner* — Tam M Nguyen
(74) *Attorney, Agent, or Firm* — Leydig, Voit & Mayer, Ltd.

(57) ABSTRACT

The present invention relates to a process for oiling essentially organic starting products with a higher molecular weight, in which hydrocarbons, preferably in liquid or semi-solid form, and a residual material with a high carbon content are obtained by the impact of high temperatures.

12 Claims, 3 Drawing Sheets

(56) References Cited

U.S. PATENT DOCUMENTS

| | | | |
|---|---|---|---|
| 2012/0149954 A1 | 6/2012 | Fraczak et al. | |
| 2012/0310023 A1 | 12/2012 | Huang et al. | |
| 2016/0145496 A1* | 5/2016 | Sorensen | C10B 49/22 |
| | | | 201/2.5 |
| 2016/0304788 A1* | 10/2016 | Sorensen | C10G 29/205 |
| 2018/0273848 A1 | 9/2018 | Atkins et al. | |
| 2018/0298294 A1* | 10/2018 | Magrini | C10G 3/50 |
| 2022/0184855 A1* | 6/2022 | Mleczko | C10B 49/10 |
| 2022/0195315 A1* | 6/2022 | Zhang | F23G 7/12 |

OTHER PUBLICATIONS

Office Action dated Nov. 24, 2022 in corresponding Chinese Patent Application No. 202080047126.8.
International Search Report dated Jun. 25, 2020 in PCT application No. PCT/EP2020/061448, 3 pages.
Office Action dated Sep. 12, 2023 in corresponding Argentinian Patent Application No. 20200101147.
Office Action dated Jan. 5, 2024 in corresponding Taiwanese Patent Application No. 109113619.

* cited by examiner

DEPOLYMERISATION METHOD

CROSS-REFERENCE TO RELATED APPLICATIONS

This application is a U.S. National Stage Application filed under 35 U.S.C. § 371 of International Application No. PCT/EP2020/061448, filed Apr. 24, 2020, which claims the benefit of European Application No. 19171126.6, filed Apr. 25, 2019. Both of these applications are hereby incorporated by reference in their entireties.

BACKGROUND OF THE INVENTION

The present invention relates to a process for oiling of essentially organic starting products with a higher molecular weight, in which hydrocarbons, preferably in liquid or semi-solid form, and a residual material with a high carbon content are obtained by the impact of high temperatures.

In view of the increasing amount of goods manufactured in industry, reuse or recycling becomes more and more the focus of attention after their use. Many of these goods are made, for example, from organic products, such as plastics and/or plastic composite materials, so that the reuse or recycling of this product class is particularly important. On the other hand, the demand for products that can be used, for example, as fuels and/or starting materials for chemical synthesis is increasing.

When oiling organic products, both of the above needs are taken into account. The principle of oiling is based on the fact that in the case of organic starting materials with a high molecular weight, such as biological residual materials as well as industrial recyclable and residual materials, a bond break or bond breaks are provoked by the impact of high temperatures of up to 900° C. and with the greatest possible exclusion of oxygen, so that smaller molecules with a lower molecular weight are formed.

One example of oiling is a catalytic, pressure-free oiling (also called thermocatalytic low-temperature conversion), which is essentially a method for depolymerization of artificial or natural polymers and long-chain hydrocarbons. They are converted with the addition of a catalyst at temperatures of less than 400° C. without excess pressure, and preferably with the exclusion of air, into short-chain, aliphatic or aromatic hydrocarbons, wherein the efficiency or the yield is usually higher in case of high-energy plastics and oils than in case of biomass. As mentioned, all high-energy substances that contain hydrocarbons can be used as starting material. Examples are plant residues, wood, straw, and animal waste as biological products, and waste oil, solid residues, rubber, sewage sludges, and particularly the aforementioned plastics mentioned as industrial products. Inorganic products such as metals, stones and other contaminants should be removed beforehand. The gases generated at the high temperatures can be separated into the different fractions by condensation.

Pyrolysis or pyrolytic decomposition can be regarded as a further example of oiling, wherein the same aforementioned starting materials are used. Pyrolysis is based on a thermo-chemical dissociation of said starting materials at temperatures of up to 900° C., wherein no additional oxygen is supplied. The products obtained can be gases, liquids, and solids, wherein particularly the liquids and waxes/paraffins can be separated into the different fractions by distillation, i.e. a fractional condensation at different temperatures occurs.

EP 3 260 181 A1 describes a process for thermal cracking of a feedstock of plastic materials, in particular waste materials. Said process comprises the following steps: Melting the feedstock, conveying the molten feedstock into a pyrolysis chamber where, after displacement of the oxygen, the molten feedstock is heated in an essentially inert atmosphere to convert it into pyrolysis gases. The process also comprises the following further steps: Introducing the pyrolysis gases from the pyrolysis chamber into a tray reflux column comprising a partial condenser at its upper extremity, returning pyrolysis gases condensed in the tray reflux column into the pyrolysis chamber and distilling pyrolysis gases which exit the partial condenser of the reflux column to obtain one or more products which are suitable as fuels. However, carbon-containing artificial coal is also formed as a by-product in the pyrolysis chamber. After completion of the pyrolysis, it has to be waited until said artificial coal has cooled before it can be removed from the pyrolysis chamber in order to make the chamber operational again for subsequent batches.

Therefore, the described process still seems to be in need of improvement in some points, such as an adaptable use through continuous operation, a variable material dosing, ensuring a completely inert atmosphere with the exclusion of oxygen in the pyrolysis chamber, and separating dusts and suspended particles from the pyrolysis gas before its fractional liquefaction.

US 2018/273848 A1 describes a pyrolysis process which is carried out at temperatures from 500° C. to 750° C. under vacuum. For this purpose, the starting materials, such as polyethylene and polypropylene, are pelletized before the pyrolysis step.

U.S. Pat. No. 6,011,187 describes a process, in which the starting materials are gasified in two stages at different temperatures, wherein the heat transfer takes place through direct contact of the starting materials with sand. In the first stage, the starting materials are mixed with sand and/or additives and heated to 250° C. to 350° C. in order to remove essentially halogens such as chlorine. In the second stage, the mixture with the sand is heated to 350° C. to 500° C. to generate pyrolysis gas. The coke remaining in the sand can be burned in the sand after the second stage.

US 2007/062104 A1 describes a specifically modified process of vacuum pyrolysis. The pyrolysis reactor works like a piston engine, i.e., it alternately generates vacuum and pressure, wherein the gasification takes place at 600° C. in a vacuum, and the pyrolysis gas and coke are discharged in the subsequent compression stroke.

In such a process, problems, such as the wear of the piston and the cylinder of the pyrolysis reactor, can often occur.

Therefore, there is still a need for flexibly usable oiling processes, for example, for a process that can be operated continuously and/or with the exclusion of oxygen.

BRIEF SUMMARY OF THE INVENTION

Therefore, the problem underlying the present invention is that of providing an oiling process and overcoming the aforementioned disadvantages of the prior art.

In particular, an oiling process is supposed to be provided which can be used permanently in continuous operation.

Furthermore, a process is supposed to be provided, in which a high degree of preparation of the starting materials, for example, a pelletization of the same, is not required. In particular, it is supposed to also be possible to use abrading starting materials and/or starting materials in a possibly soft, spongy state.

In addition to the exclusion of oxygen in the pyrolysis chamber (reactor), an exclusion of oxygen is also supposed to be ensured when the starting products are fed into the pyrolysis chamber, and also during the discharge of the carbon-containing residual material from the pyrolysis chamber, particularly also during continuous operation.

In addition, a process with essentially energetically self-contained operation is supposed to be provided.

Furthermore, a simplified cleaning/condensation of the pyrolysis gas is supposed to be ensured by separating undesired by-products, such as dusts and ashes, from the generated pyrolysis gas.

At least one of these problems is solved by the present application according to the claims.

Therefore, the subject matter of the present invention is a continuous process for producing hydrocarbons, comprising the steps of
 (a) providing an organic starting product,
 (b) transferring the organic starting product into a reactor,
 (c) heating the starting product to produce a pyrolysis gas,
 (d) feeding the pyrolysis gas to a two-part or multi-part column to obtain separate liquid and/or semi-solid fractions of hydrocarbons,
 (e) obtaining the separated hydrocarbons obtained in step (d),
wherein steps (b) and (c) are executed in the absence of oxygen and under inert gas, and wherein in step (c), the starting product is heated to 400° C. to 600° C.

In the aforementioned EP 3 260 181 A1 and in laboratory operation, the oiling is usually carried out in batch operation. For this purpose, a batch of the starting material is transferred to the reactor and heated in said reactor to generate the pyrolysis gas, which is subsequently separated into the corresponding fractions by distillation. The reactor can then be charged again and the further steps can also be carried out again.

In contrast to that, the present process is a continuous process. In other words, the continuous charging of the reactor with the starting product as well as a continuous operation of the reactor and the feeding of the generated pyrolysis gas to the two-part or multi-part column as well as the continuous obtaining of the hydrocarbons is ensured. Furthermore, the carbon-containing residual material (also called artificial coal or coke) can also be removed continuously from the reactor with the exclusion of oxygen, without having to interrupt or even completely discontinue the process.

In a preferred embodiment, the hydrocarbons obtained in step (e) contain aliphatic and aromatic hydrocarbons with 1 to 75 carbon atoms, preferably 2 to 60 carbon atoms, more preferably 3 to 40 carbon atoms, particularly 6 to 30 carbon atoms. These hydrocarbons can comprise, for example, alkanes, cycloalkanes, cycloparaffins, and aromatic compounds known to a person skilled in the art. The hydrocarbons are preferably present in solid or liquid form at 23° C. and 101.325 kPa (normal pressure), preferably in liquid form. The preferably generated products have a boiling point in the range of diesel, gasoline, and waxes/paraffins.

In step a), an organic starting product is provided. In the context of this invention, organic starting products are substances which are based on carbon and hydrogen and can also contain elements such as oxygen, nitrogen, sulfur, and halogen. As described above, organic starting products can be natural substances or substances of natural origin or also synthetically (artificially) produced substances. The organic starting products can also be called substitute fuels or secondary fuels because they could also be used to generate thermal energy through combustion.

Examples of natural substances as organic starting products are vegetable or animal dyes, sugars, fats, proteins, and vitamins. The above-mentioned plant residues, wood, straw, animal waste, natural rubber, and substances such as crude oil and coal are also included.

Examples of synthetic substances as organic starting products are, as mentioned above, waste oil, solid residues, rubber, and plastics, which are obtained, for example, from waste treatment of domestic and commercial waste, production waste, and recycling of scrap cars.

Synthetic materials, particularly plastic or a mixture of plastics, are preferably used as organic starting products in the present process.

Plastics (in German: "Kunststoffe") are materials that essentially consist of macromolecules. The plastics are often colloquially referred to as plastic (in German: "Plastik"). In a preferred embodiment, the plastic is a polymer. The polymer is composed of one or more structural units, the so-called constitutional repeating units. The plastics or polymers known to a person skilled in the art can be used in the present process.

Examples of polymers are polyesters, such as polybutylene terephthalate, polyethylene terephthalate, polyethylene naphthalate, and polycarbonates; polyethers such as polyalkylene glycol ethers, polyethylene glycol, polyoxymethylene, polyoxymethylene dimethyl ether, polypropylene glycol, polytetrahydrofuran, and polyvinyl ether; polyamides, such as PA612 (from hexamethylene diamine and dodecanedioic acid), PA11 (from 11-aminoundecanoic acid), PA12 (from laurolactam or ω-aminododecanoic acid), and PA 6/12 (from caprolactam and laurolactam); substituted and unsubstituted polyalkylenes, such as polyethylene, polypropylene, polyvinyl acetate, polyvinyl alcohol, polyvinyl chloride, and poly(alkyl)meth(acrylates) as well as polyurethanes and copolymers thereof. Polypropylene (PP), polyethylene (PE), polyethylene terephthalate (PET), polyamides (PA), acrylic-butadiene-styrene copolymer (ABS), polybutylene terephthalate (PBT) and mixtures thereof are preferably used as organic starting products.

A polyalkylene is more preferably used as the plastic. Examples of polyalkylenes are polyethylene, polypropylene, and copolymers thereof.

The organic starting products preferably contain chloride in an amount of less than 1.0 wt. % and/or mercury in an amount of less than 1.2 mg/kg of starting product and/or thallium in an amount of less than 2.0 mg/kg of starting product and/or water in an amount of less than 15.0 wt. %, preferably less than 10% wt. %, more preferably less than 5% wt. %. In a preferred embodiment, the abovementioned water content can be achieved by drying the organic starting product, for example, under reduced pressure, preferably at 50 to 600 mbar, and/or at an elevated temperature, preferably at 40° C. to 70° C.

Furthermore, the organic starting product is preferably present at a grain size of less than 60 mm, more preferably of less than 30 mm, particularly of less than 25 mm, which, among others, ensures an unproblematic transfer into the reactor (step (b)). Alternatively, if the starting product is present in the form of a film, the surface of the film is preferably less than 0.25 m², more preferably less than 0.2 m², particularly less than 0.1 m². The abovementioned grain size or the surface of the film can be achieved by the shredding processes known to a person skilled in the art, such as cutting, tearing, grinding, and sieving.

The organic starting product preferably has an energy density (a heating value) of 15 to 40 MJ/kg, preferably from 18 to 35 MJ/kg, particularly from 25 to 30 MJ/kg.

The starting materials in step a) do not have to be processed beyond the most common degree of material preparation. It is particularly preferred that the starting materials do not have to be pelleted.

In a preferred embodiment, a catalyst can be added to the organic starting product. The catalyst can be added before the transfer or the direct feed of the organic starting product into the reactor, or in the reactor itself; the catalyst can preferably be added to the organic starting product before the transfer or the direct feed of the organic starting product into the reactor.

A catalyst is a substance that increases the reaction rate of a chemical reaction by reducing the activation energy without being consumed itself.

The corresponding commercially available catalysts, such as aluminosilicate-based zeolites, can be used in the present process.

In a preferred embodiment, red mud, fly ash, bauxite, mullite, zeolites, preferably from the ZSM series, particularly the ZSM-5 series, FCC catalysts ("fluid catalytic cracking" catalysts), hematite, iron(II) oxide, iron, or mixtures thereof are used as the catalyst.

In a more preferred embodiment, fly ash, particularly activated fly ash, is used as the catalyst. Activated fly ash is fly ash which has been subjected to a pretreatment known to a person skilled in the art. For example, fly ash was sieved, mixed with NaOH, calcined (melted), ground, mixed with water, hardened, filtered, washed, and dried.

In an alternatively more preferred embodiment, red mud is used as the catalyst. Red mud is a residue that can be generated, for example, when bauxite is processed using the Bayer process for obtaining aluminum oxide. The finely ground bauxite is mixed with NaOH, wherein aluminum hydroxides can dissolve. The insoluble compounds remain in the residue, the red mud. Red mud can essentially contain 30 to 40 wt. % $Fe_2O_3$, 20 to 30 wt. % $Al_2O_3$, 10 to 17 wt. % $TiO_2$, 5 to 12 wt. % $SiO_2$, 3 to 6.5 wt. % CaO, and 1 to 3 wt. % $Na_2O$.

In a further preferred embodiment, an input material for removing organic and inorganic halogen compounds, such as fluorine, chlorine, bromine, and iodine compounds and/or sulfur compounds, which were generated during the pyrolysis of the organic starting product in the reactor, can also be added to the organic starting product. In other words, the input material can be regarded as an adsorbent for the halogen and/or sulfur compounds generated during the pyrolysis. They can be continuously discharged from the reactor in the same way as other residual materials from the pyrolysis, such as carbon-containing artificial coal (coke).

Examples of input materials for removing organic and inorganic halogen and/or sulfur compounds are calcium hydroxide ($Ca(OH)_2$), calcium oxide (CaO), calcium carbonate ($CaCO_3$), caustic soda (NaOH), soda ($Na_2CO_3$), potassium hydroxide (KOH), potash ($K_2CO_3$), hematite ($Fe_2O_3$), red mud, or a mixture thereof.

In a preferred embodiment, red mud or hematite, more preferably red mud, is added to the organic starting product because red mud is effective both as a catalyst and as an input material for removing organic and inorganic halogen and/or sulfur compounds.

In a preferred embodiment, the organic starting product and the catalyst can be used in the reactor at a weight ratio of 10:1 to 1:2.

In an alternative preferred embodiment, no catalyst is added to the organic starting product. This means that the process according to the invention can also be carried out in the absence of a catalyst.

In step (b), the organic starting product is transferred into a reactor, wherein this step is carried out in the absence of oxygen.

The transfer of the organic starting product into the reactor can be carried out in any manner known to a person skilled in the art. For this purpose, for example, all known transfer devices or conveyors can be used; the transfer of the organic starting product can preferably be carried out by one or more conveyor belts. Furthermore, during the transfer of the starting product, metal can be separated using a metal separator. By separating the metal parts that may have remained in the organic starting product with the metal separator, the system parts, such as the transfer device, can be protected, and a trouble-free or almost trouble-free operation of the process can be achieved. As a result, an increased stability of a device, in which the process according to the invention is carried out, can be achieved. In addition, the above-mentioned separation of metal parts prevents or at least advantageously reduces the formation of possible by-products in step (c), in which the starting product is heated under exclusion of oxygen.

In the present process, the transfer of the organic starting product into the reactor is carried out in the absence of oxygen and under inert gas. In the context of the present invention, this means that the organic starting product has essentially already been freed of oxygen which, for example, can be present in the surrounding atmosphere, usually air, in the gaps between the individual starting product pieces. This can be carried out with any evacuation system known to a person skilled in the art for generating a negative pressure with a possible subsequent dissipation of the negative pressure by introducing an inert gas, particularly nitrogen.

In a preferred embodiment, the organic starting product is freed of oxygen in step (b). For example, in the present process, the organic starting product can be freed of oxygen on a conveyor belt via a double lock system. In other words, in the present process, the organic starting product is freed of oxygen by evacuating the gas surrounding the organic starting product, particularly air, by means of a vacuum pump via two lock chambers, each with a double flap system. An inert gas, preferably nitrogen, preferably up to the atmospheric pressure, can then be applied to the organic starting product. This process can be repeated several times in order to displace as much oxygen as possible. The introduction of the organic starting product into the reactor can then preferably take place via a cooled screw conveyor. As a result, the introduction of the organic starting product into the reactor is thus preferably carried out in a pressure-free manner.

In the context of the present process, the reactor itself is also freed of oxygen and brought to the desired temperature before the start of the transfer of the organic starting product or the first introduction thereof into the reactor. For this purpose, the reactor is heated and an inert gas, preferably nitrogen, is made to flow through the reactor. Before the reactor is filled with the input material, it is purged with the inert gas in order to ensure that oxygen is excluded as completely as possible, and that the reactor is filled with the inert gas as completely as possible.

In step (c), the organic starting product is heated in order to produce pyrolysis gas. In a preferred embodiment, step (c) is carried out by heating the reactor. For this purpose, the reactor is heated directly or indirectly, preferably indirectly.

In a preferred embodiment, the reactor is preferably indirectly heated in step (c) via a double wall. The reactor can be heated via a double wall using any heating device known to a person skilled in the art. The one or more heating zone(s) of the reactor are preferably heated to a heating zone-specific, constant temperature, at which the pyrolysis of the starting product subsequently takes place, using one or more hot gas generator(s). These temperatures lie in the range between 400° C. to 600° C., preferably between 450° C. and 580° C., particularly between 500° C. and 560° C.; particularly preferably, this temperature is approximately 550° C.

In a preferred embodiment, the water-insoluble gases and non-condensable gases from the top of the column and/or the pyrolysis gases guided through a post-combustion chamber can be fed to the heating device in order to heat the reactor after the above-mentioned temperature has been reached, so that the process according to the invention can be carried out energetically self-contained. Preferably, the water-insoluble gases and non-condensable gases can be cleaned, for example, by a gas scrubber, before being fed to the heating device.

The hot gas generators can be all devices known to a person skilled in the art for generating high temperatures. The hot air supply to the reactor preferably consists of gas burners and the respective combustion chambers. In the chambers, the heat of the flame of the gas burner can be transferred to the air, so that the gap between the double wall of the reactor in the respective heating zone can be heated to the desired temperature.

In addition, the larger pieces of the organic starting product are preferably mixed in the reactor, preferably by means of an agitator, and the carbon-containing residual material is transported to the discharge. Furthermore, the organic starting product is preferably mixed intensively, preferably by means of an agitator, optionally compressed and made accessible for a faster heat input. In addition, the pieces of the organic starting product are partially or completely, preferably completely, converted into the gaseous phase. Further preferably, the organic starting product is also preferably distributed by means of an agitator over the largest possible inner surface of the reactor, so that the greatest possible heat transfer can take place on the reactor side of the double wall. In the rear part of the reactor, the agitator is less inclined.

The mean residence time of the organic starting material in the reactor at the aforementioned temperature range is between 15 and 120 minutes, preferably between 20 and 100 minutes, particularly between 30 and 90 minutes, particularly about 45 minutes. In the process, a thermal decomposition of bonds in the organic starting product takes place under the exclusion of oxygen, wherein pyrolysis gas is generated. A thermal decomposition under the exclusion of oxygen can also be called a cracking process.

Residual materials, preferably solid residual materials, can be formed as by-products in the present process. Examples of solid residual materials which can be formed in the present process are the above-mentioned carbon-containing artificial coal and possible mineral components which were also present in the organic starting product. The residual materials can be discharged from the reactor, wherein this is carried out in the present process in such a way that an oxygen input into the reactor is prevented when the residual materials are discharged. For this purpose, the accumulation of the residual material (ash horizon) can be ensured in the present process, for example, by means of a buffer chute. The residual materials can subsequently be discharged from the reactor, preferably with cooling, for example, via a cooled screw conveyor. The residual materials are cooled, preferably to room temperature, by the cooled screw conveyor. The cooling can preferably prevent the oxidation of the carbon contained in the residual material.

In a preferred embodiment, the pyrolysis gas obtained in step (c) is removed at the upper end of the reactor and subjected to step (d). This is done in order to avoid or at least greatly reduce possible undesired further side reactions. In a preferred embodiment, the generated pyrolysis gases comprise gaseous hydrocarbons. Furthermore, the generated pyrolysis gases preferably do not comprise hydrocarbons in liquid or solid form.

In step (d), the pyrolysis gas is fed from the reactor via a connecting device to a two-part or multi-part column in order to obtain separate fractions of hydrocarbons. For this purpose, the pyrolysis gas can be fed continuously from the reactor room to a two-part or multi-part column, preferably via an insulated pipe duct, for fractionation.

In the present process, the two-part or multi-part column is preferably configured as a two-part column. In a preferred embodiment, the first part of the column is arranged between the reactor or the insulated pipe duct and the second part of the column and can be regarded as the lower part of the two-part or multi-part column. The second part of the column is arranged above the first part of the two-part or multi-part column. It is therefore also called the upper part of the column. The first (lower) and second (upper) part of the column are preferably connected to one another in a fluid-tight manner, i.e., in both a gas-tight and liquid-tight manner. In the present process, this fluid-tight connection can preferably be configured as an insulated pipeline or flange connection, particularly as an insulated pipeline.

In the present process, the gas is cooled and, depending on the boiling range, its components are fractionally liquefied when the pyrolysis gas is fed into the two-part or multi-part column. The removal of the individual fractions of the fractionally liquefied components can be ensured, for example, using control valves. In other words, by feeding the pyrolysis gas into the two-part or multi-part column, it is subjected to a (fractional) condensation, in which the different fractions are obtained separately from one another.

In a preferred embodiment, the first (lower) part of the two-part or multi-part column, preferably the two-part column, is a quench column. As described above, in the present process, the pyrolysis gas is fed continuously from the reactor to the two-part or multi-part column and thus to the quench column. The quench column can be a common distillation column or a fractionating column. A fractionating column is a distillation column in which the column body is provided with components (also called trays) to intensify the heat and material exchange between gasous and liquid phase. In the present process, a fractionating column contains a plurality of trays, preferably 10 to 30 trays, particularly about 15 trays. In addition, the quench column is preferably operated under a slight negative pressure, particularly at a top pressure of 0.75 to 0.85 bar, preferably approximately 0.8 bar. Within the quench column, the temperature of the pyrolysis gas is preferably reduced to 280° C. to 320° C., particularly to approximately 300° C. The liquid bottom product of the second, upper column can be used, among others, for cooling the pyrolysis gas. In addition, the quench column is preferably equipped with one or more temperature measuring points for checking the proper execution of the present process.

In a preferred embodiment, the second part of the two-part or multi-part column, preferably the two-part column, is a fractionating column. The fractionating column in the second (upper) part of the two-part or multi-part column preferably has a plurality of trays, preferably 10 to 40 trays, more preferably 20 to 35 trays, particularly about 30 trays. The gas cooled as it passes through the quench column flows through the gas-tight connection of the first and second column into the second column, the fractionating column. Like the first column (quench column), the fractionating column is preferably operated under a slight negative pressure, particularly at a top pressure of 0.75 to 0.85 bar, preferably approximately 0.8 bar.

Both in the first (lower) part and in the second (upper) part of the two-part column, an equilibrium between the liquid and gaseous phase of the corresponding fraction can be established at the components, such as the trays. In other words, in this way, separate, liquid hydrocarbons can be obtained, preferably fractionally, at different trays in the preferably two-part column, wherein this obtaining and the separation are achieved by the different boiling range of the corresponding fractions.

In a preferred embodiment of the present process, the flow rate of the pyrolysis gas is lower in the first part of the two-part or multi-part column than in the subsequent second part of the two-part or multi-part column. It is particularly preferred that the flow rate of the pyrolysis gas in the first part of the preferably two-part column is lower than in the subsequent second part of the preferably two-part column. Due to the lower flow rate in the first part of the column, a cleaning effect of the pyrolysis gas can be achieved. For example, no dust particles or ashes are entrained into the second (upper) part of the preferably two-part column.

In one embodiment of the present process, in step (d), water, for example, water formed during the pyrolysis or already present in the organic starting product, is separated from the hydrocarbons by phase separation. In this water phase, pollutants, such as acidic compounds, volatile heavy metals, for example, mercury, and halogens, for example, chlorine, can accumulate, which leads to a lower proportion of these substances in the subsequent fractions ("pollutant removal"). For this purpose, a phase separator known to a person skilled in the art can be used. The separated water can preferably be fed to a water treatment unit, where the pollutants are separated.

In step (e), the separated preferably liquid hydrocarbons obtained in step (d) are obtained. This means that the separated preferably liquid hydrocarbons are discharged from the preferably two-part column via a discharge system and, if necessary, are further processed or cleaned. The hydrocarbons obtained after discharge from the preferably two-part column are preferably in liquid form at 23° C. (room temperature) and 101.325 kPa (normal pressure). Alternatively preferred, the hydrocarbons can solidify after being discharged from the preferably two-part column, particularly from the first part of the preferably two-part column, so that they can be present as a semi-solid substance or in solid form. A semi-solid substance is a substance that is in a state between the solid and liquid state, for example, a wax, such as paraffin wax. These substances are preferably stored in the warm, liquid state.

For this purpose, the first part (quench column) of the preferably two-part column can be equipped with one or more control valves as a discharge system, through which fractions with a boiling range of more than 300° C. and less than 500° C. can be discharged/removed. In a preferred embodiment, a fraction with a boiling range from the entry temperature of the pyrolysis gas (synthesis gas) to about 320° C. is removed. This fraction can contain hydrocarbons with up to 75 carbon atoms. Examples are heavy oils/paraffins. Due to the high temperature in the bottom of the quench column, the bottom product is preferably cooled when the product storage tanks are filled.

Furthermore, the second part (fractionating column) of the preferably two-part column can comprise one or more temperature sensors which can monitor the temperature of the bottom, of the individual trays, and of the top in the fractionating column. Like the quench column, the fractionating column can also be equipped with one or more control valves, through which the individual fractions can be removed in the desired ranges. In a preferred embodiment, a fraction with a boiling range of 220° C. to 320° C. is removed. This fraction can contain hydrocarbons with 7 to 22 carbon atoms. Examples are diesel fuels. A fraction with a boiling range from 150° C. to 200° C. can preferably also be removed. This fraction can contain hydrocarbons with 5 to 9 carbon atoms. Examples are gasoline fuels.

In addition, the part of the pyrolysis product (gaseous top product) which is still gaseous after passing through the preferably two-part column is preferably fed via a feed system to a main condenser which condenses/liquefies further fractions of the pyrolysis gas while cooling. These liquefied/condensed fractions can preferably also be removed via a control valve. A fraction with a boiling range from 50° C. to 150° C. is preferably removed. This fraction is also called the top fraction and can contain aliphatic or aromatic hydrocarbons with 1 to 10 carbon atoms, preferably with 2 to 9 carbon atoms, particularly with 5 to 7 carbon atoms. Examples include alkanes such as pentane, hexane, heptane, octane, and alkenes, such as pentenes, hexenes, heptenes, octenes. Further examples are cycloalkanes, such as cyclopentane, cyclohexane, cycloheptene, and cycloalkenes, such as cyclohexene and cycloheptene as well as aromatic compounds, such as benzene, toluene, o-xylene, m-xylene and p-xylene.

Optionally, further secondary condensers, including their feed systems, can be connected downstream of the main condenser, which are essentially based on an identical mode of operation, essentially the removal of the condensation heat.

The pyrolysis gas generated in the reactor can further contain gaseous components which can not only pass through the preferably two-part column, but also through the main condenser and optional further secondary condensers without being condensed/liquefied therein. As a result, these gases cannot be discharged/removed in liquid form from the column, the main condenser and/or further optional secondary condenser(s) and leave the main condenser or the further optional secondary condensers in a still gaseous state. These components of the pyrolysis gas are called off-gases and preferably contain hydrocarbons preferably hydrocarbons with 1 to 5 carbons atoms. Examples of components of the off-gas are methane, ethane, ethene, propane, propene, n-butane, isobutane, isobutene, 1-butene, 2-butene, 2,2-dimethylpropane, cyclopropane, and cyclopropene.

In a preferred embodiment, the off-gas escaping via the main condenser and one or more optional secondary condensers can be fed via a pipe system to the above-mentioned gas burner for heating the reactor. In a preferred embodiment, the off-gas is subjected to a cleaning step for removing pollutants after leaving the last condenser. For this purpose, purification devices for gases, such as gas scrubbers, known to a person skilled in the art can be used. By feeding the off-gas via a pipe system to the gas burner for heating the reactor, the present process becomes energetically self-contained after a start-up process. According to a further embodiment, the condensers can be operated by setting a corresponding cooling temperature in such a way that the fraction of the off-gases varies in its composition, and the heating value of these off-gases can thus be set. By means of this off-gas, the process according to the invention can be operated in an energetically self-contained manner as described above and/or electrical energy (electricity) and heat can be obtained, for example, using a gas engine.

DETAILED DESCRIPTION OF THE INVENTION

A further subject matter of the present invention is a device for carrying out the process according to the invention.

Figure 1:
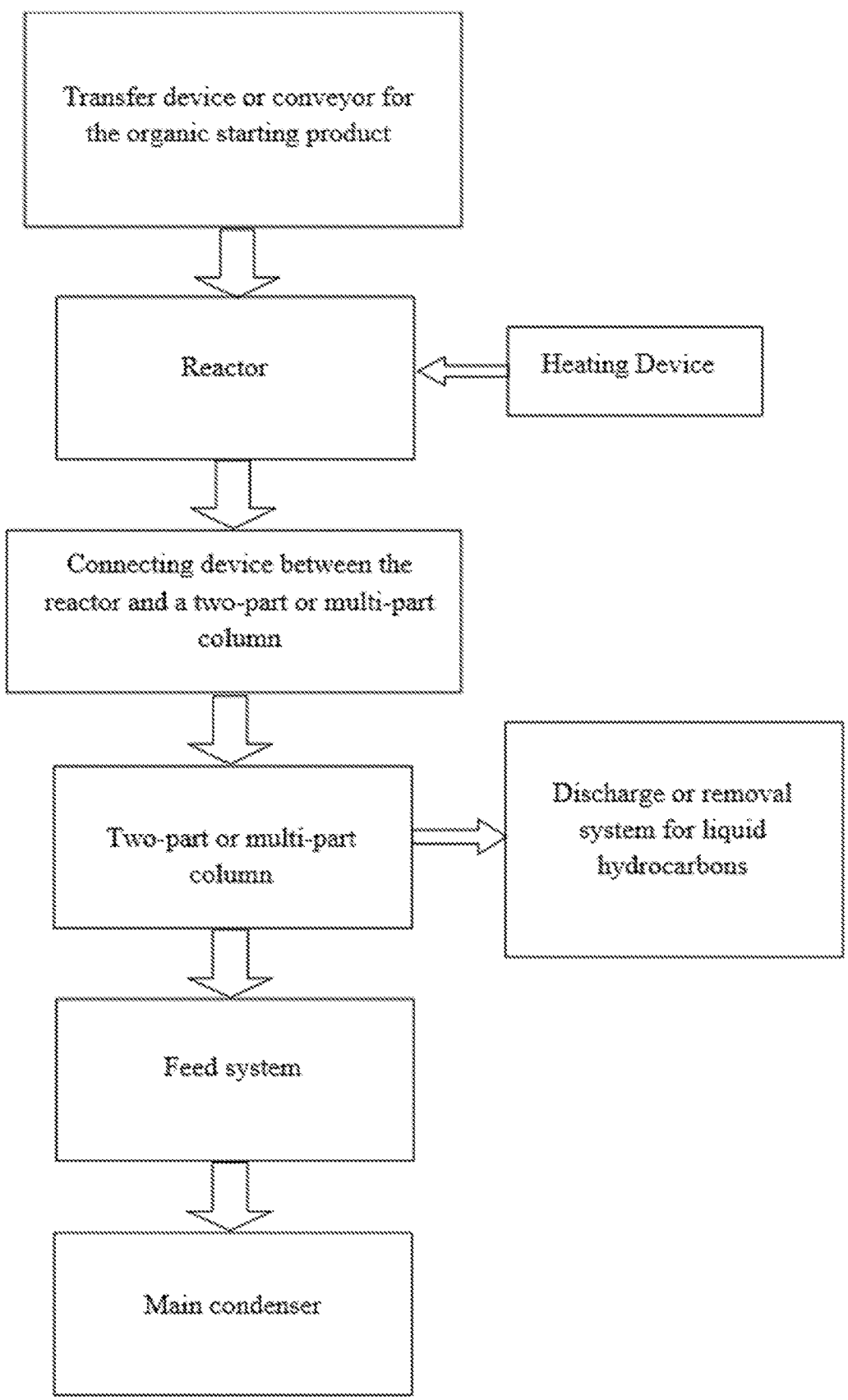
FIG. 1 shows the block diagram of a device according to the invention.

The device according to the invention comprises
(1) a transfer device or a conveyor for the organic starting product
(2) a reactor
(3) a heating device
(4) connecting device between the reactor and a two-part or multi-part column
(5) two-part or multi-part column
(6) discharge or removal system for liquid hydrocarbons
(7) feed system
(8) main condenser FIG. 1 shows the block diagram of a device according to the invention.

The transfer device or conveyor (1) transfers the starting product into the reactor. In a preferred embodiment, the transfer device can be a conveyor belt, which preferably comprises a metal separator.

In addition, the transfer device (1) comprises a system, with which it is ensured that the transfer of the organic starting product into the reactor can be carried out in the absence of oxygen. This system can be, for example, an evacuation system for generating a negative pressure with a possible subsequent dissipation of the negative pressure by introducing an inert gas, particularly nitrogen. In a preferred embodiment, the system is a double lock system, which has two lock chambers, each with a double flap system.

Furthermore, the transfer device can preferably have a cooling device in order to enable the introduction of the organic starting product into the reactor on a cooled transfer device, which can preferably prevent the starting product from melting.

Figure 2:
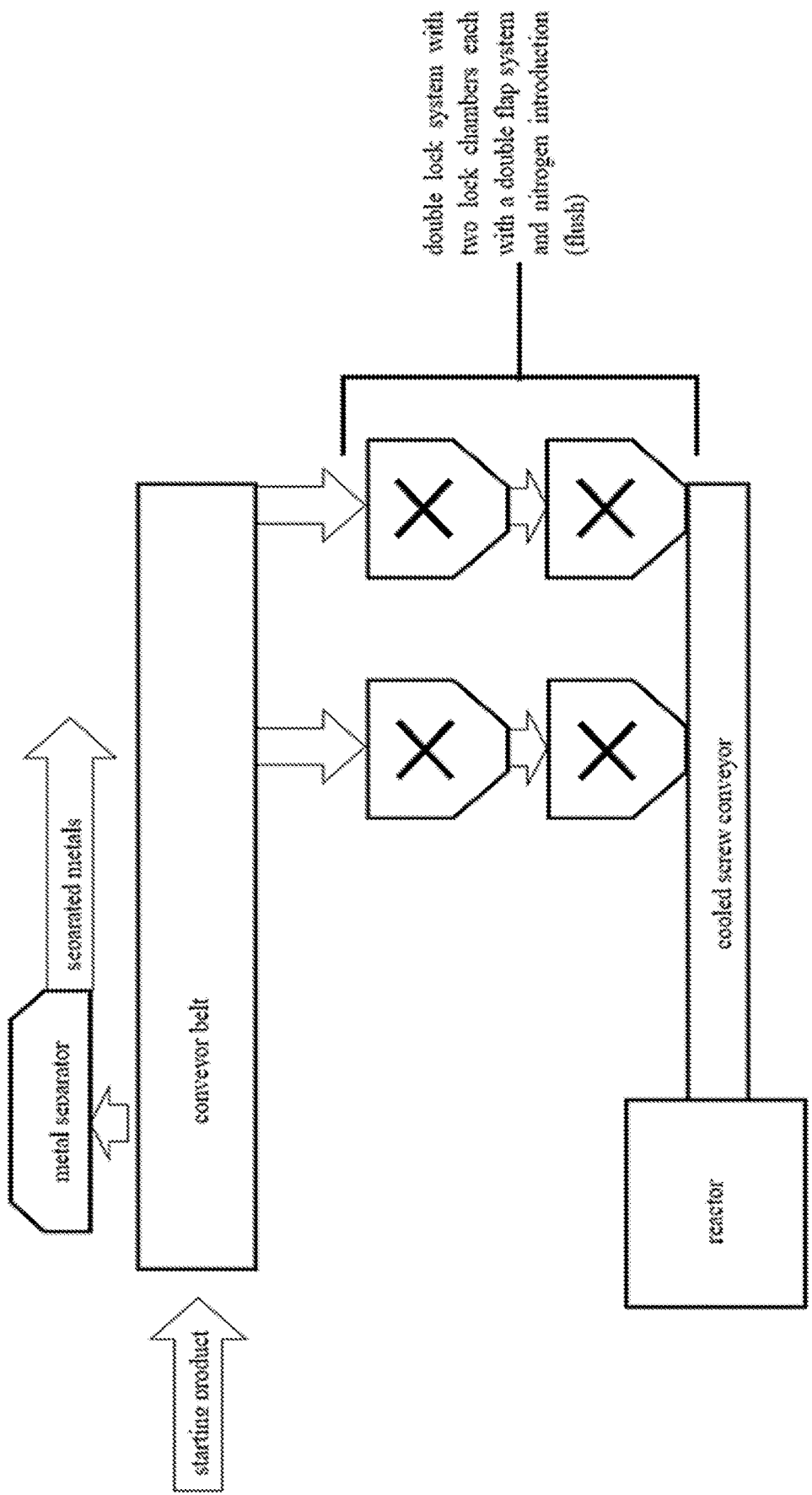
FIG. 2 shows an embodiment of the transfer device according to the invention to the reactor.

FIG. 2 shows an embodiment of the transfer device according to the invention to the reactor.

In the reactor (2), the starting product is heated in order to generate pyrolysis gas. The reactor is preferably heated indirectly via a double wall. In addition, the reactor preferably comprises an agitator, with which the organic starting product can be shredded, mixed and/or distributed over the largest possible inner surface of the reactor. For intensive mixing for a faster heat input and for compressing the material used, the agitator is preferably configured such that the front part of the agitator has a different inclination, preferably a stronger inclination than the rear part.

The reactor can be heated using any heating device (3) known to a person skilled in the art. The heating device is preferably a hot gas generator, particularly one or more gas burners with the respective combustion chambers.

The pyrolysis gas produced in the reactor is fed to the two-part or multi-part column (5) via a connecting device (4). In other words, this means that the reactor is connected to the two-part or multi-part column via a connecting device, and that the pyrolysis gas is fed from the reactor through/via said connecting device to the two-part or multi-part column. In a preferred embodiment, said connecting device is a pipe duct, preferably an insulated pipe duct.

The two-part or multi-part column (5) is preferably a two-part column, wherein the two columns are preferably connected in a fluid-tight manner. The fluid-tight connection is preferably an insulated pipeline or flange connection, particularly a pipeline.

The first (lower) part of the preferably two-part column is preferably a quench column, which can be a common distillation column or a fractionating column, preferably a fractionating column. The quench column, which is preferably configured as a fractionating column, can contain a plurality of trays, preferably 10 to 30 trays. The quench column is preferably provided with one or more temperature measuring points.

The second (upper) part of the preferably two-part column is preferably a fractionating column. The fractionating column in the second (upper) part of the preferably two-part column preferably has a plurality of trays, preferably 10 to 40 trays, more preferably 20 to 35 trays, particularly about 30 trays.

In a preferred embodiment, the diameter of the first (lower) part of the preferably two-part column is greater than the diameter of the subsequent second (upper) part of the preferably two-part column. This configuration makes it possible for the flow rate of the pyrolysis gas to be lower in the first part of the preferably two-part column than in the subsequent second part of the preferably two-part column.

Figure 3:
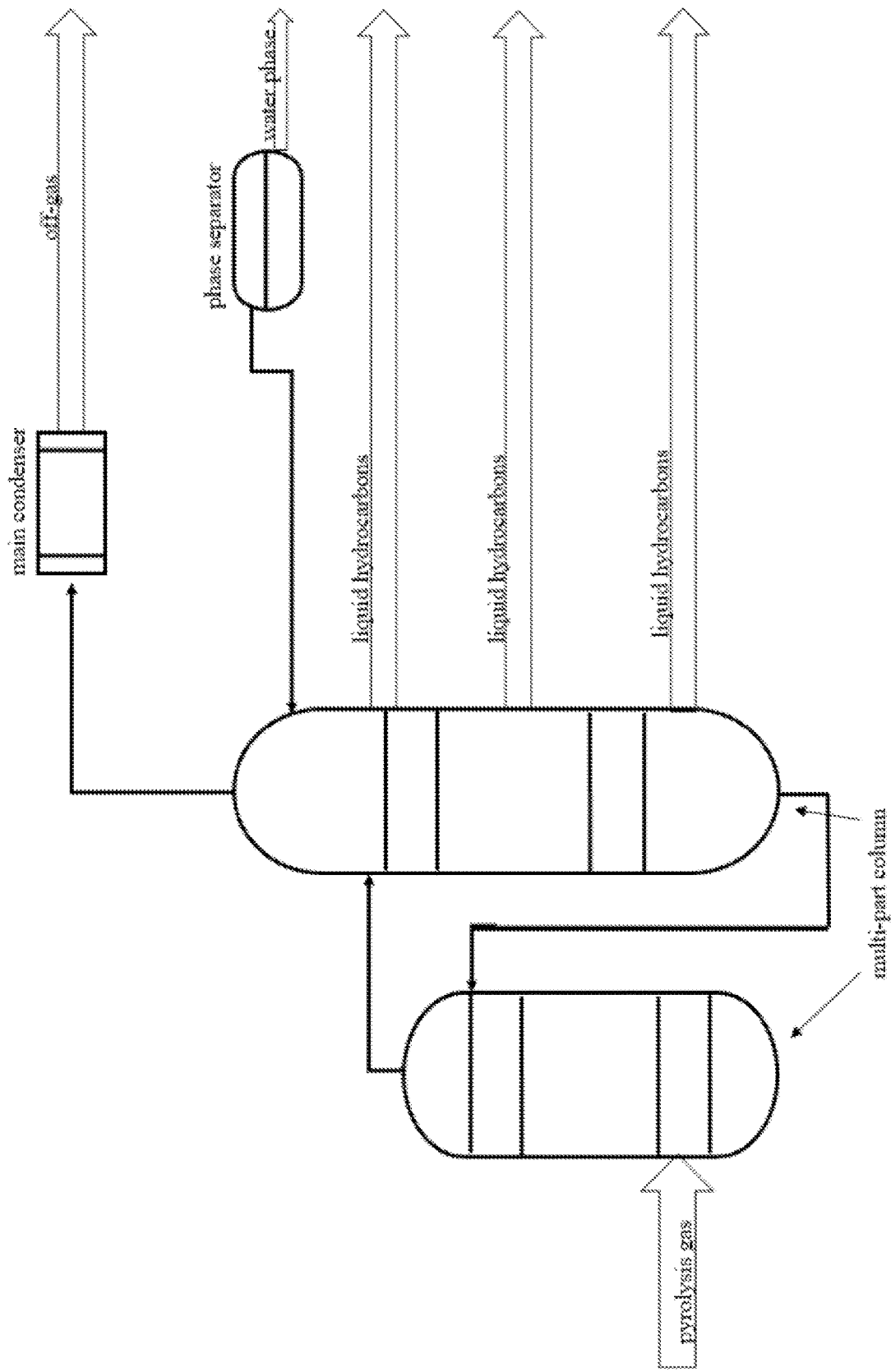
FIG. 3 shows an embodiment of the two-part or multi-part column according to the invention with cooling circuit.

FIG. 3 shows an embodiment of the two-part or multi-part column according to the invention with cooling circuit.

The lower column of the preferably two-part column preferably contains a discharge or removal system (6), via which fractions of liquid hydrocarbons can be discharged/removed. The same applies to the upper column of the preferably two-part column. The discharge system (6) of both the lower and the upper part of the preferably two-part column can preferably be configured as a control valve.

The device according to the invention further comprises a feed system (7) which is arranged between the column head of the second (upper) part of the preferably two-part column and the main condenser. Non-liquefied/condensed components of the pyrolysis gas are fed to a main condenser via the feed system in the preferably two-part column.

The feed system (7) can be a pipe or a socket, preferably a socket.

The main condenser (8) is a condenser, in which further fractions of the pyrolysis gas can be liquefied while cooling. It is preferably equipped with a control valve for removing the liquefied fractions.

Optionally, further secondary condensers, including their feed systems, can be connected downstream of the main condenser (8), which are essentially based on an identical mode of operation. In a preferred embodiment, the device according to the invention comprises two secondary condensers, wherein the second secondary condenser, for condensation, cools at a lower temperature than the first secondary condenser which is arranged between the main condenser and the second secondary condenser.

The device according to the invention can furthermore preferably comprise a pipe system, with which uncondensed off-gas of the heating device can be fed from the main condenser, or from an optional secondary condenser, preferably to the above-mentioned gas burner for heating the reactor or to a gas engine for generating electric energy (electricity) and heat.

In a preferred embodiment of the device according to the invention, a cleaning device for gases can be arranged in said pipe system. Cleaning devices for gases are known to a person skilled in the art. One example is a gas scrubber. With the help of this cleaning device for gases, pollutants can be removed from the off-gas before they are fed to the above-mentioned gas burners or a gas engine.

The invention claimed is:

1. A continuous process for producing hydrocarbons comprising the steps of:
   (a) providing an organic starting product,
   (b) transferring the organic starting product into a reactor,
   (c) heating the starting product to produce a pyrolysis gas,
   (d) continuously feeding the pyrolysis gas from the reactor to a two-part or multi-part column to obtain separated liquid and/or semi-solid fractions of hydrocarbons,
   (e) obtaining the separated hydrocarbons obtained in step (d),
   wherein steps (b) and (c) are executed in the absence of oxygen and under inert gas,
   wherein in step (c), the starting product is heated to 400° C. to 600° C., wherein the starting product is a plastic or a mixture of plastics, wherein a second part of the two-part or multi-part column is a fractionating column, and wherein, a flow rate of the pyrolysis gas is lower in a first part of the two-part or multi-part column than in a subsequent second part of the two-part or multi-part column.

2. The process according to claim 1, wherein the hydrocarbons obtained in step (e) are aliphatic and aromatic hydrocarbons having 1 to 70 carbon atoms.

3. The process according to claim 1, wherein a catalyst is added to the starting product.

4. The process according to claim 1, wherein in step (b), the oxygen is removed from the starting product.

5. The process according to claim 3, wherein the catalyst comprises an aluminum-containing compound.

6. The process according to claim 1, wherein step (c) is carried out by heating the reactor.

7. The process according to claim 1, wherein mean residence time of the starting product in step (c) is 20 to 100 minutes.

8. The process according to claim 1, wherein the pyrolysis gas obtained in step (c) is removed at an upper end of the reactor and subjected to step (d).

9. The process according to claim 1, wherein a first part of the two-part or multi-part column is a quench column.

10. The process according to claim 1, wherein in step (d), water is separated from the hydrocarbons by phase separation.

11. The process according to claim 1, further comprising adding an input material to the organic starting product, wherein the input material is able to adsorb organic and inorganic halogen compounds from the generated the pyrolysis gas.

12. The process according to claim 1, further comprising removing carbon-containing residual material from the reactor without having to interrupt steps (a)-(e).

* * * * *